March 17, 1953 O. McD. WOODWARD, JR 2,632,108

DIPLEXER ARRANGEMENT

Filed July 28, 1949 2 SHEETS—SHEET 1

INVENTOR
Oakley M. Woodward, Jr.
BY Harry Tunick
ATTORNEY

March 17, 1953 O. McD. WOODWARD, JR 2,632,108

DIPLEXER ARRANGEMENT

Filed July 28, 1949 2 SHEETS—SHEET 2

INVENTOR
Oakley M. Woodward, Jr.
BY Harry Tunick
ATTORNEY

Patented Mar. 17, 1953 2,632,108

UNITED STATES PATENT OFFICE 2,632,108

DIPLEXER ARRANGEMENT

Oakley McDonald Woodward, Jr., Princeton, N. J., assignor to Radio Corporation of America, a corporation of Delaware Application July 28, 1949, Serial No. 107,208

20 Claims. (Cl. 250—33.53)

The invention relates to antenna systems for very high frequency reception over a wide frequency range incorporating means in an antenna array to reverse the directional characteristic provided.

This application is a continuation-in-part of co-pending application Serial Number 67,825, filed December 29, 1948, and while the invention resides in the diplexer hereinafter disclosed, it is described by way of example in connection with the antenna array disclosed in the copending application in order to express the invention in such terms as to clearly explain the mode of operation and enable one skilled in the art to construct and use the invention with optimum results.

With the present frequency allocations and assigned powers, of commercial television and frequency modulation transmitters, objectionable interference is often experienced at fringe area receiver locations between co-channel stations located in different directions from the receiving location.

Interfering signals from adjacent channel stations lying in the opposite direction are also picked up by receivers with inadequate selectivity. While this type of interference may be reduced by means of wave traps or pre-amplifiers, no benefit is obtained as far as co-channel interference is concerned.

As most of the stations now operating are centered in the large metropolitan regions, efficient multichannel reception at outlying areas is possible with a receiving antenna having a directivity which does not shift in direction with frequency-channel variation.

The copending application mentioned above describes a receiving antenna having a uni-directional characteristic at all channels with means provided to reverse the directional characteristic at will in order to receive from both directions.

This prior art arrangement utilized a re-entrant loop diplexer network for the purpose of reducing adverse effects introduced principally by mismatch of the array to the transducer. This prior art diplexer not only was expensive in construction, but furthermore, it was physically bulky to the extent that its inclusion in a television receiver installation in the average home was highly undesirable except as a matter of last resort.

Therefore, it is an object of the invention to provide a simple and effective diplexer for coupling two loads to a single source of energy or two sources of energy to a single load.

It is a more specific object of the invention to provide a diplexer for an antenna system having an essentially reversible single lobe beam with high front-to-back ratio.

It is another object of the invention to provide an antenna system incorporating simple and effective means for reducing or eliminating adverse effects caused by mismatch between the antenna array and the transducer.

It is a further object of the invention to provide a diplexer for use with a reversible beam array which is simple and economical in construction.

It is still another object of the invention to provide a simple and effective diplexer for an antenna system whereby the directivity characteristics may be reversed by means of a simple feed line transportation.

It is a still further object of the invention to provide a diplexer for a reversible beam antenna system which does not require adjustments by the operator, except for positioning a simple toggle switch to effect beam reversal.

Yet a further object of the invention is to provide a light, compact and inexpensive diplexer whereby the arrangement is made practicable for home receiver installations.

Yet an additional object of the invention is to provide a simple and effective means whereby energy reflections due to mismatches in the antenna system are absorbed to eliminate "ghost pictures" in the reception of television signals.

These and other objects of the invention which appear in the following specification are obtained by means of an antenna system comprising a known array constituted by four half-wave dipoles arranged as the parallel sides of a parallelepiped and interconnected by means of a diplexer network to transducer means. Diagonally opposite dipoles are joined by suitable transmission lines to form broadside and endfire arrays, respectively, the midpoints of the two joining transmission lines being connected by further transmission lines down the array support to a novel diplexer network located near the transducer. A beam reversing switch is preferably provided near the transducer to transpose one of the two lines leading to the array to reverse the directivity provided by the array.

The invention will be described with reference to the accompanying drawing forming part of the specification and in which:

Fig. 1 is a diagrammatic illustration of an antenna system according to the invention;

Fig. 2 constitutes a vectorial representation of the operation of the antenna system according to the invention;

Figures 1, 2, 3:
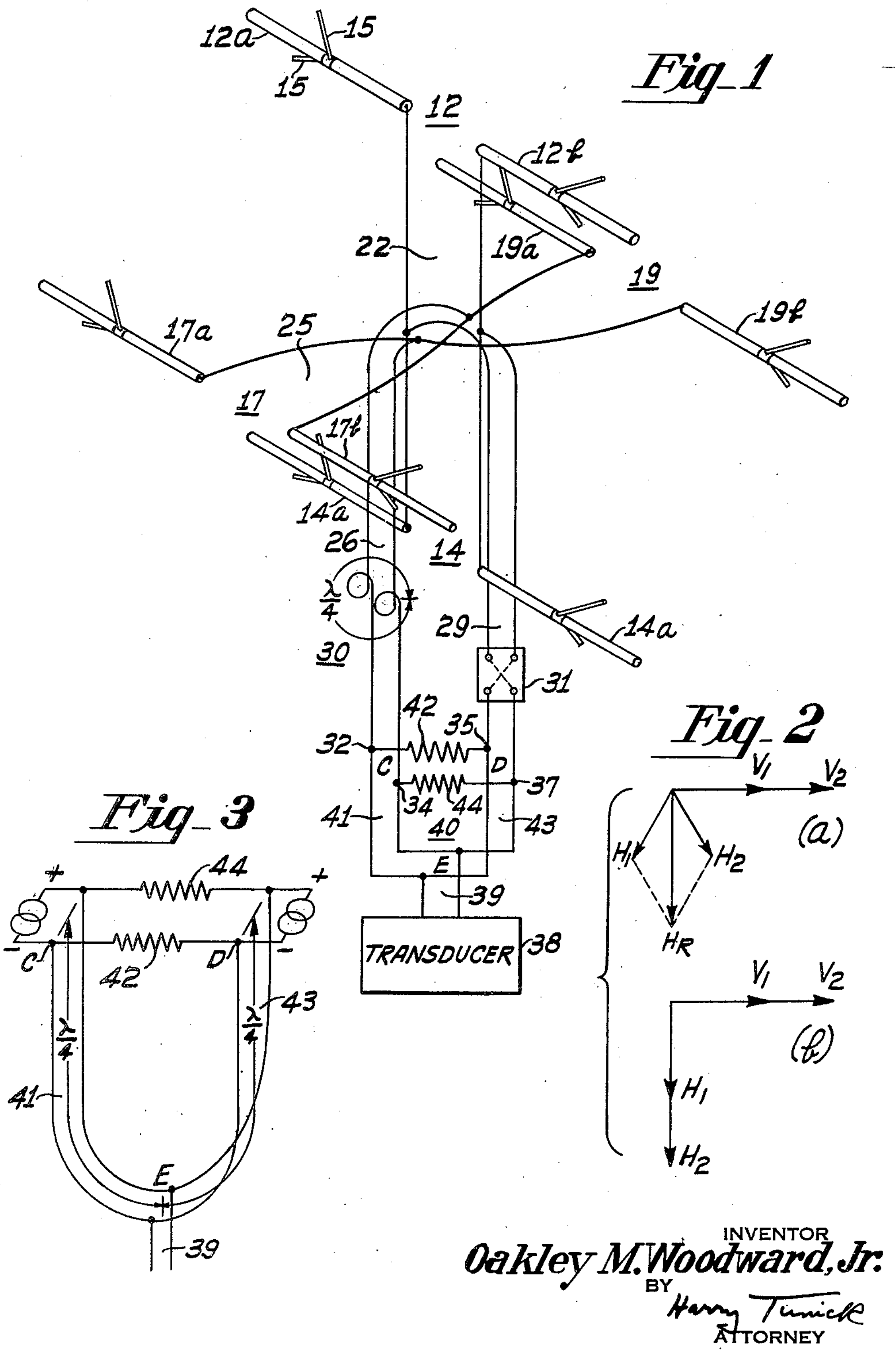
Fig. 3 is a schematic diagram of a diplexer network employed according to the invention.

Referring to Fig. 1, there is shown a known antenna array suitable for use with the invention which antenna comprises four half-wave dipoles, 12, 14, 17, and 19, arranged in intersecting horizontal and vertical planes, respectively. Preferably, dipoles 12, 14, 17 and 19 are resonant at a frequency in the lower television band. Dipoles 12 and 14 are directly interconnected by means of a length of transmission line 22, and dipoles 17 and 19 are interconnected by means of a length of transmission line 25 which is twisted throughout its length or otherwise transposed effectively to connect dipole 17 180° out of phase with dipole 19. At the midpoints of each of transmission lines 22 and 25, additional feed lines 26 and 29 are connected. Due to the fact that the field pattern afforded by simple dipoles shown exhibit complex multilobal configurations at the higher frequencies, unidirectional reception in the higher frequency channels is insured by arranging sets of rigid conductor members 15 on dipole conductors 12, 14, 17 and 19 in V formation in the vertical plane of the dipoles as mounted in the array. In accordance with the teachings of the copending application Serial Number 67,826, filed December 29, 1948, conductors 15 preferably make an angle of 45° with conductors of the dipoles and are located approximately midway thereof, to provide figure-eight field patterns throughout the entire television frequency band. Feed line 26, shown connected to transmission line 25, has interposed therein a quarter-wave phase shifting section 30, which may be conveniently constituted by an additional length of transmission line one-quarter wavelength long at the central operating frequency. Transmission line 29, which is connected to the midpoint of transmission line 22, has incorporated therein a phase reversing switch shown schematically at 31, which switch may be any one of a number of suitable types, either manually or electrically operated. It is understood, of course, that the phase shifting section 30 and the reversing switch 31 may be incorporated in transmission line 26 and 29 as indicated, both of them connected in the same transmission line, or phase shifting section 30 in line 29 and switch 31 in line 26.

A transducer 38, which in general will be a television receiver, is connected by a length of transmission line 39 and a diplexer network 40 to terminals 32, 34 and 35, 37 of transmission lines 26 and 29, respectively. Diplexer network 40 comprises essentially a pair of transmission line sections 41, 43 which are preferably a quarter wavelength long at the midband operating frequency and joined together at one end to transmission line section 39 and having the corresponding opposite ends connected together by means of resistors 42 and 44, respectively. It should be noted at this point that transmission line sections 41, 43 need not have any particular relationship to the operating wavelength as long as they have substantially the same electrical length, as will be shown hereinafter.

The theory of operation of the diplexer according to the invention may be most simply explained by tracing the paths of incident and reflected waves throughout the entire system in which it may be used, thereby avoiding a more rigorous mathematical analysis. While the diplexer according to the invention is equally applicable to systems for radiating or receiving energy, the explanation will be based on its use for reception, it being understood, of course, that radiation of energy is readily obtained to an equally effective degree.

Referring to Fig. 1, the desired incoming wave induces equal-magnitude voltages on all four dipoles, 12, 14, 17, 19. As the vertical pair of dipoles, 12, 14, normal to the wave direction, the currents $V_1$, $V_2$ presented to transmission line 29 are as indicated in the vector diagram of Fig. 2. Horizontal dipoles 17 presents a current $H_1$ to transmission line 26 which is leading the currents $V_1$ and $V_2$ by an angle $2\pi d/\lambda$ where $d$ is the spacing of each of the dipoles from the geometrical center of the array. However, since transmission line 25 is transposed, the direction of the current $H_1$ is reversed. Horizontal dipole 19 presents a current $H_2$ to transmission line 26 which is lagging $V_1$ and $V_2$ by an angle $2\pi d/\lambda$. The resultant vector $H_R$ of the sum of $H_1$ and $H_2$ is seen to be always in quadrature with the resultant vector of the sum of $V_1$ and $V_2$, as is shown at (*a*) of Fig. 2. The two resultant magnitudes will be equal when $d$ is equal to one quarter-wave and the impedances of all four dipoles are equal, as shown at (*b*) of Fig. 2.

Since the end-fire dipoles 17 and 19 are connected in phase opposition, there is no mutual coupling between the two groups of dipoles 12, 14 and 17, 19. As the dipoles are relatively far apart (one-half wavelength in the lower band) the mutual impedance between individual dipoles of each pair is small with respect to the dipole self-impedance. Hence the impedances at the midpoints of transmission lines 22 and 25 are approximately the same over a wide frequency range even though the individual self-impedances may vary to a considerable degree.

The main incident waves from dipoles 12, 14 and 17, 19 travel down transmission lines 29 and 26, respectively, and arrive at points C and D of the diplexer 40 in phase, since the leading wave from dipoles 12, 14 has traveled through an extra $\lambda/4$ length of line at loop 30. The equivalent circuit of the diplexer under these conditions may thus be shown as in Fig. 3.

As the respective terminals of resistors 42 and 44 are at the same potential, no power is absorbed by the resistors and the waves arrive in-phase at the transducer terminals. For a mis-matched termination, a reflected wave travels back to the array and is re-directed down transmission line 26 and 29, arriving at diplexer terminals 32, 34 and 35, 37 in out-of-phase relationship. This phase reversal is brought about by one of the waves traveling twice over the quarter-wave phasing line 30. For the out-of-phase condition the voltage distribution on transmission line sections 41 and 43 will be that shown in Fig. 4A. Since transducer 38 is coupled by means of transmission line section 39 to the midpoint of the two line sections, no energy will be transmitted thereto because the midpoint is a voltage null.

Figure 4:
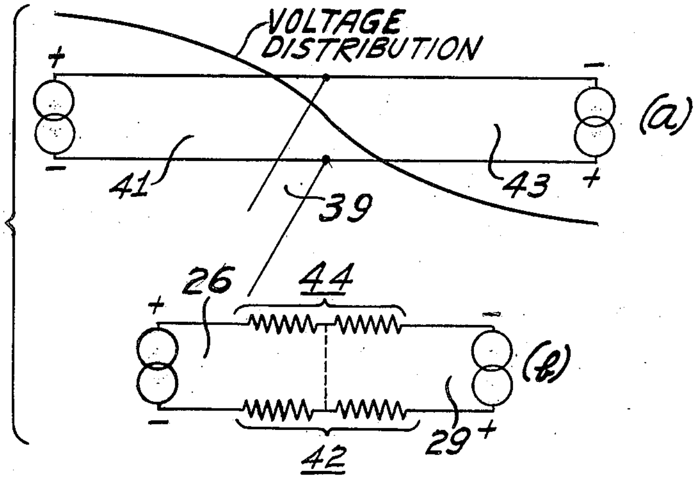
Fig. 4 is an equivalent diagram of the arrangement of Fig. 3 illustrating the operation thereof.

Referring to Fig. 4B, however, it will be seen that resistors 44 and 42 are connected in series with the out-of-phase sources and absorb the redirected energy. In practice, resistors 42, 44 will be 300 ohms since most commercially produced television receivers are designed for a 300 input transmission line. In this figure, resistors 42 and 44 are each shown schematically as two separated resistors and the junctions thereof are indicated as being at zero potential by the dotted line connections, from which it is readily seen that each half of each resistor should be 150 ohms in order that the 300 ohm lines 26 and 29 be properly terminated. Again, it is evident that each resistor 42, 44 should have a total value of 300 ohms to completely absorb the redirected energy.

It should be noted, however, that the use of 300 ohm resistors is predicated on the use of 300 ohm transmission lines throughout and, as is well known to those skilled in the art, a different value may be necessary for use with lines of other characteristic impedances, whether they are all of the same characteristic impedance or not.

It should be noted here that the diplexer operation is practically independent of frequency since a voltage minimum always occurs at the midpoint E for the connections shown, and, at frequencies other than midband, transmission lines 41 and 43 always present equal reactances at the points C and D. It is, of course, preferable that the reactances presented be held as low as practical so to do, which calls for line section an odd multiple of quarter wavelengths wherever possible.

From points C and D the two waves arrive at point E in phase and are applied in phase to transmission line 39 and transducer 38. If the transducer is not properly terminated, a reflected wave is propagated back to the antenna where it is redirected if the dipoles are not matched. This redirected wave arrives at points C and D out of phase, as the wave on line 26 has traveled twice over the extra quarter-wave section 30. In this case, all of the energy is absorbed in the resistors 42, 44 and none in the receiver.

Assuming that the incoming signal strikes the array from the opposite direction, the main waves traveling down transmission lines 26 and 29 will arrive at points C and D out of phase. Under this condition all of the energy will be absorbed by the resistors 42, 44 and none will pass to transducer 38.

Thus resistors 42, 44 serve a dual purpose, that of absorbing the undesired signal from the backward direction as well as absorbing the reflections caused by mismatched antennas and mismatched transducer input. As the diplexer network is generally located very close to the receiver, "ghost" images are therefore eliminated.

The direction of the incoming wave determines whether the quadrature signal is leading or lagging, and, referring to both Figs. 1 and 2, it will be seen that the dipole spacing, or, conversely, the variation in frequency, may change considerably from a quarter wavelength without seriously affecting the relative amplitude of the two signals.

It should be obvious at this point that transducer 38 may be a source of energy and separate load elements may be connected to terminals 32, 34 and 35, 37 of diplexer 40 to receive the energy without interaction upon each other. In such an arrangement, diplexer 40 will serve to reduce or eliminate reflections due to mismatch in exactly the same manner as heretofore described.

Figure 5:
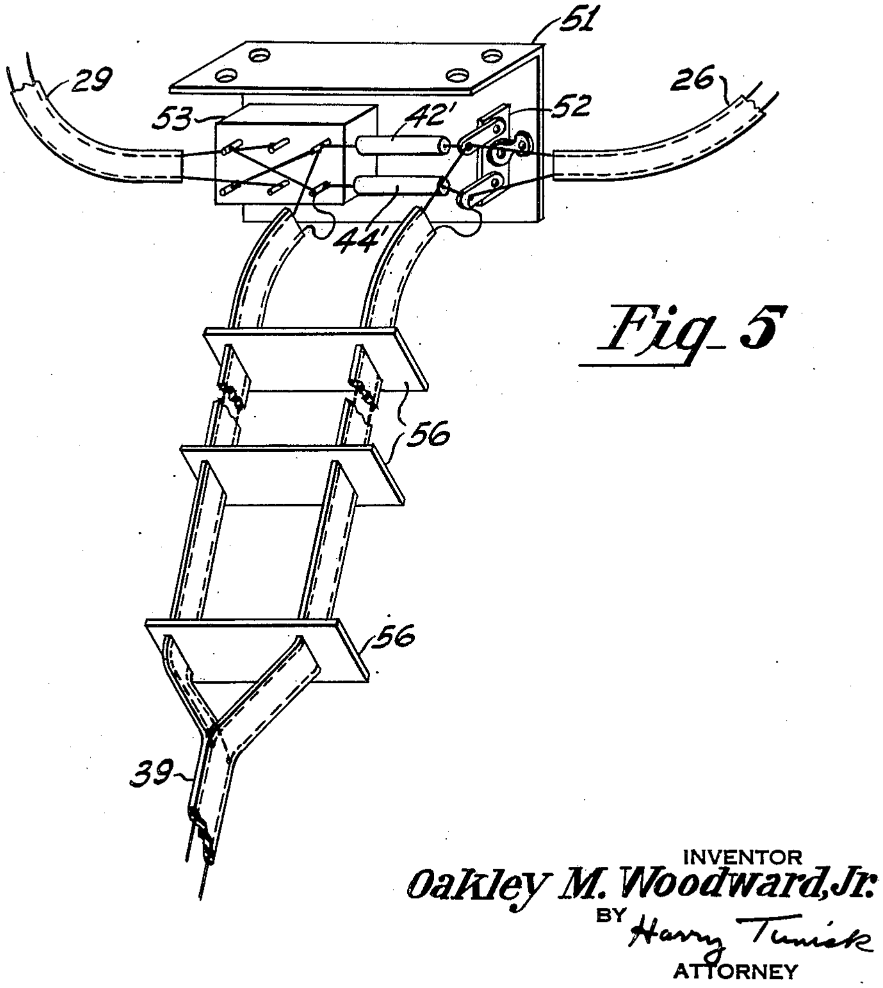
Fig. 5 is an illustration of a practical embodiment of part of the antenna system of Fig. 1 according to the invention.

Referring to Fig. 5, there is shown a practical embodiment of the construction of a diplexer according to the invention illustrating the advantageous construction thereof. On a small metal bracket 51 there is mounted a convenient terminal strip and a further terminal strip 53. Terminal strip 53 in its simplest form is constituted by the terminals of a double-pole, double-throw toggle switch and in a slightly more elaborate form as the terminal strip of a double-pole, double-throw relay, the actuating switch of which will preferably be located on the front panel or elsewhere of the television receiver. The terminals of terminal strip 53 are connected in known manner with respect to the contacts of the switch or relay to provide a reversing switch. Transmission lines 26 and 29 are respectively connected to the terminals of terminal strip 52 and the terminals of terminal strip 53 which correspond to the arms of the switch or relay means. Resistors 42' and 44' are directly connected between terminals of strip 52 and to the cross-connected terminals of terminal strip 53. Lengths of transmission line are connected to the ends of resistors 42' and 44', which lengths are exactly equal and approximately a quarter wavelength at the midband operating frequency and are connected together at the ends remote from bracket 51. A length of transmission line which need be only as long as is necessary to reach the antenna terminals of the television receiver is connected to the junction of the two transmission lines. Preferably, bracket 51 is mounted near the front of the television receiver table or cabinet for ready access to the switch, although if a relay means is used as suggested above, these parts may be placed in any location desired. A few rubber spacers 56 are preferably used to keep these transmission lines separated at fixed distances.

While the invention has been described in terms of a specific application of an express embodiment, it is to be understood that various applications and modifications will be suggested to one skilled in the art without departing from the spirit and scope of the invention.

I claim:

1. A diplexer arrangement including first, second and third pairs of terminals, a pair of resistance elements intercoupling terminals of said first pair of terminals and corresponding terminals of said second pair of terminals, and two lengths of transmission line respectively intercoupling corresponding terminals of said first and said third pairs of terminals and said second and said third pairs of terminals, said elements having resistance values high with respect to the direct current resistance of said lengths of transmission line.

2. A diplexer arrangement including first, second and third pairs of terminals, a pair of resistance elements of equal value intercoupling terminals of said first pair of terminals and corresponding terminals of said second pair of terminals, and two equal lengths of transmission line respectively intercoupling corresponding terminals of said first and said third pairs of terminals and said second and said third pairs of terminals, said elements having resistance values substantially equal to the characteristic impedance values of said lengths of transmission line.

3. A diplexer arrangement comprising a length of transmission line having two conductors, resistors individually connecting the ends of each of said conductors together to form closed loops, means to couple a first source of wave energy to said diplexer at a junction of said resistors and one end of each of said conductors, means to couple a second source of said wave energy to the junction of the other ends of said resistors and said conductors, and means to connect a transducer to said transmission line at a point electrically equidistant from said junctions of the conductors thereof and said resistors.

4. An antenna system including an array comprising a pair of dipoles spaced apart and arranged parallel to each other, a second pair of dipoles spaced apart and arranged parallel to each other in a plane intersecting the plane defined by the first said pair of dipoles, a first transmission line directly connecting the first said pair of dipoles, a second transmission line connecting said second pair of dipoles in opposition, a network comprising two lengths of transmission line connected in series and two resistors connecting the ends of the interconnected conductors of said lengths of transmission line to form closed loops, further transmission lines coupling the midpoints of the first said and said second transmission lines to said network at alternate junctions of said two lengths of transmission line and said resistors, a phase shifting network interposed in one of said further transmission lines, and means to couple a transducer to the junction of said two lengths of transmission line of said network.

5. An antenna system including an array comprising a pair of dipoles spaced apart and arranged parallel to each other, a second pair of dipoles spaced apart and arranged parallel to each other in a plane normal to the plane defined by the first said pair of dipoles, a first transmission line directly connecting the first said pair of dipoles, a second transmission line connecting said second pair of dipoles in opposition, a network comprising two resistors and a length of transmission line, each of said resistors being connected across the ends of a conductor of said length of transmission line to form a closed loop therewith, further transmission lines coupling the midpoints of the first said and said second transmission lines to said network at alternate junctions of said length of transmission line and said resistors, a phase shifting network interposed in one of said further transmission lines, a switch interposed in one of said further transmission lines selectively to transpose the same, and means to couple a transducer to the midpoint of said length of transmission line.

6. An antenna system including an array comprising a pair of dipoles resonant to a given frequency and spaced a half-wave apart at said given frequency and arranged parallel to each other, a second pair of dipoles resonant to said given frequency and spaced a half-wave apart at said given frequency and arranged parallel to each other in a plane normal to the plane defined by the first said pair of dipoles, conductors arranged at points on said dipoles to radiate outwardly from the center of said dipoles at an angle of substantially 45° with respect to said dipoles, all of said conductors lying in parallel planes defined by each dipole and associated conductor, a first transmission line directly connecting the first said pair of dipoles, a second transmission line connecting said second pair of dipoles in opposition, a network comprising two resistors and two lengths of transmission line substantially one-quarter wavelength long at said given frequency connected in series, one of said resistors being connected between the ends of one pair of interconnected conductors of said two lengths of transmission line remote from the junction thereof and the other resistor being connected to the ends of the other conductors remote from said junction, further transmission lines coupling the midpoints of the first said and said second transmission lines to said network at alternate ends of said two lengths of transmission line, a phase shifting network comprising a length of transmission line a quarter wavelength long at said given frequency interposed in one of said further transmission lines, a switch interposed in one of said further transmission lines selectively to transpose the same, and means to couple a transducer to the junction of said two lengths of transmission line of said network.

7. An antenna system including an array comprising a pair of dipoles resonant to a given frequency and spaced a half-wave apart at said given frequency and arranged parallel to each other, a second pair of dipoles resonant to said given frequency and spaced a half-wave apart at said given frequency and arranged parallel to each other in a plane normal to the plane defined by the first said pair of dipoles, V-shaped conductors arranged at points on said dipoles to radiate away from the centermost part of said dipoles at an angle of substantially 45° with respect to said dipoles, all of said V-shaped conductors lying in parallel planes, a first transmission line directly connecting the first said pair of dipoles, a second transmission line connecting said second pair of dipoles in opposition, a network comprising two lengths of transmission line substantially one-quarter wavelength long at said given frequency connected in series, a pair of resistors, one of said resistors being shunted by a connection constituted by one of the conductors of one of said lengths of transmission line and the conductor of the other of said lengths of transmission line interconnected therewith, the other resistor being shunted by a connection constituted by the remaining conductors of said lengths of transmission line, transmission lines coupling the midpoints of the first said and said second transmission lines to said network at the ends of said two lengths of transmission line, a phase shifting network comprising a length of transmission line a quarter wavelength long at said given frequency interposed in one of said further transmission lines, a switch interposed in one of said further transmission lines selectively to transpose the same, and means to couple a transducer to the junctions of the two series connected lengths of transmission line of said network.

8. An antenna system including an array comprising a pair of dipoles arranged one above the other, a second pair of dipoles arranged one behind the other and midway between the dipoles of the first said pair, an in-phase coupling transmission line connected between the dipole of the first said pair, an anti-phase coupling transmission line connected between the dipoles of said second pair, a diplexer network including a first resistor connected between the ends of a conductor of a length of transmission line substantially a halfwave long at the operating frequency and a second resistor connected between the ends of another conductor of said halfwave line, further transmission lines coupling the midpoints of said in-phase coupling and anti-phase coupling transmission lines to said diplexer network at the ends of said pair of resistors, a phase shifting network interposed in one of said further transmission lines, a phase-anti-phase switch interposed in one of said further transmission lines, and transducer means coupled to said diplexer network at a point on said halfwave line midway between the points connected to said further transmission lines.

9. An antenna system including an array comprising a pair of dipoles arranged one above the other, a second pair of dipoles arranged one behind the other and midway between the dipoles of the first said pair, each of said dipoles having V-shaped conductors arranged thereon, the legs of said V-shaped conductors lying in parallel planes and making substantially equal angles with the associated dipoles, an in-phase coupling transmission line connected between the dipoles of the first said pair, an anti-phase coupling transmission line connected between the dipoles of said second pair, a diplexer network comprising a transmission line section having a length of substantially a half wavelength at the mid-band operating frequency and a pair of resistors of the value substantially equal to the characteristic impedance of said transmission line sections individually connecting the ends of the individual conductors thereof together, further transmission lines coupling the midpoints of said in-phase coupling and anti-phase coupling transmission lines to said diplexer network at the ends of said resistors, a phase shifting network interposed in one of said further transmission lines, a phase-anti-phase switch interposed in one of said further transmission lines, and transducer means coupled to said diplexer network at a point midway between the ends of said transmission line section.

10. A diplexer arrangement including a pair of conductors and a pair of resistance elements, the ends of one of said conductors being connected individually to the terminals of one of said resistance elements and the ends of the other of said conductors being connected individually to the terminals of the other of said resistance elements, said conductors being arranged to provide a transmission line of given characteristic impedance, said resistance elements having resistance values high with respect to the resistance of said conductors, means to connect complementary utilization apparatus to the ends of the transmission line formed by said conductors, and means to connect further utilization apparatus to said conductors at substantially the midpoints thereof.

11. A diplexer arrangement including a pair of conductors and a pair of resistors, the ends of one of said conductors being connected individually to the terminals of one of said resistors and the ends of the other of said conductors being connected to the terminals of the other of said resistors, said conductors being arranged to provide a transmission line of predetermined characteristic impedance, said resistors having resistance values substantially equal to the value of said predetermined characteristic impedance, means to connect complementary utilization apparatus to the ends of the transmission line formed by said conductors, and means to connect further utilization apparatus to said conductors at substantially the midpoints thereof.

12. A diplexer arrangement including a pair of conductors having a length substantially equal to a half wavelength at a desired operating frequency, and a pair of resistors, the ends of one of said conductors being connected individually to the terminals of one of said resistors, and the ends of the other of said conductors being connected to the terminals of the other of said resistors, said conductors being arranged to provide a transmission line of predetermined characteristic impedance, said resistors having resistance values substantially equal to the value of said predetermined characteristic impedance, means to connect complementary utilization apparatus to the ends of the transmission line formed by said conductors, and means to connect further utilization apparatus to said conductors at substantially the midpoints thereof.

13. A diplexer circuit arrangement including a closed loop circuit comprising a section of transmission line of given characteristic impedance substantially a half wavelength long at a desired operating frequency and having the opposite ends of each conductor thereof interconnected by a resistance element of value substantially equal to the value of said characteristic impedance, means to couple transducer apparatus across said section of transmission line at substantially the midpoint thereof, and means to couple complementary transducer apparatus to said section of transmission line at opposing ends thereof.

14. A diplexer circuit arrangement for coupling complementary antennas to transducer apparatus, including resistive means intercoupling corresponding terminals of said complementary antennas and equal lengths of transmission line coupling said complementary antennas in parallel with said transducer apparatus said resistive means having values high with respect to the direct current resistance of said length of transmission line.

15. A diplexer arrangement for coupling complementary antennas to transducer, including individual transmission lines being connected in parallel to said transducer apparatus, and a resistor bridged between one conductor of one of said transmission lines and the conductor of the other of said transmission lines connected to said one conductor and another resistor bridged between the remaining conductors, said resistors being connected to said conductors at points thereon equidistant from said transducer apparatus.

16. A diplexer arrangement for coupling complementary antennas to transducer apparatus, including individual transmission lines connected to said complementary antennas, said transmission lines being connected in parallel to said transducer apparatus, and a resistor bridged between one conductor of one of said transmission lines and the conductor of the other of said transmission lines connected to said one conductor and another resistor bridged between the remaining conductors, said resistors being connected to said conductors at points thereon one-quarter wavelength from said parallel connections at a given operating frequency.

17. A diplexer circuit arrangement including a closed loop circuit comprising a section of transmission line of given characteristic impedance and having a length of substantially a half wavelength at a desired operating frequency and having the opposite ends of each of the conductors thereof interconnected by a resistance element, means to couple transducer apparatus across said section of transmission line at the midpoint thereof, and means to couple complementary transducer apparatus to said transmission line at opposing ends of said transmission line.

18. A transmission line arrangement for substantially eliminating deleterious effects of mismatch between a load of given impedance and a plurality of energy sources feeding said load at the same frequency, including a section of transmission line of characteristic impedance substantially equal to said given impedance and coupling one of said energy sources to said load, another section of transmission line of the same characteristic impedance and the same length as the first said section and coupling another of said energy sources to said load, and a pair of resistors having resistance values substantially equal to said given impedance, each of said resistors being connected between one end of one conductor of one of said sections of transmission line and one end of the conductor of the other sections of transmission line having the other end thereof connected to the other end of said one conductor at said load.

19. A transmission line arrangement for substantially eliminating deleterious effects of mismatch between an energy source and a plurality of loads energized by said source, including a section of transmission line having a given characteristic impedance, and coupling said source to one of said loads, another section of transmission line of the same characteristic impedance and the same length as the first said section and coupling said energy source to the other of said loads, and a pair of resistors having resistance values substantially equal to said given impedance, each of said resistors being individually connected between one terminal of one of said loads and the terminal of the other load directly connected by conductors of said sections of transmission line.

20. A transmission line arrangement for substantially eliminating deleterious effects of mismatch between a plurality of load and energy source elements of given impedance at the same frequency, including a section of transmission line of characteristic impedance substantially equal to said given impedance, another section of transmission line of the same characteristic impedance and the same length as the first said section, said sections of transmission line being connected together at one end and coupled to one of said elements, and a pair of resistors having resistance values substantially equal to said given impedance, one of said resistors being connected between the other end of one of the conductors of one of said sections of transmission line and the other end of the conductor of the other of said sections of transmission line connected to said one conductor at said one element and the other of said resistors being connected to the remaining conductors in like manner.

OAKLEY McDONALD WOODWARD, JR.

REFERENCES CITED

The following references are of record in the file of this patent:

UNITED STATES PATENTS

| Number | Name | Date |
|---|---|---|
| 2,206,644 | Rocard | July 2, 1940 |
| 2,244,756 | Alford | June 10, 1941 |
| 2,344,884 | Kirkland | Mar. 21, 1944 |
| 2,410,657 | Hershberger | Nov. 5, 1946 |
| 2,418,124 | Kandoian | Apr. 1, 1947 |
| 2,424,982 | Higgins | Aug. 5, 1947 |